(12) United States Patent
Kuhry

(10) Patent No.: US 8,071,042 B2
(45) Date of Patent: Dec. 6, 2011

(54) METHOD AND APPARATUS FOR APPLICATION OF ELECTROSTATIC CHARGES TO COMPOUNDS HELD WITHIN CONTAINERS

(76) Inventor: Anthony B. Kuhry, Skokie, IL (US)

(*) Notice: Subject to any disclaimer, the term of this patent is extended or adjusted under 35 U.S.C. 154(b) by 1104 days.

(21) Appl. No.: 11/862,723

(22) Filed: Sep. 27, 2007

(65) Prior Publication Data

US 2008/0253942 A1 Oct. 16, 2008

Related U.S. Application Data

(62) Division of application No. 10/460,273, filed on Jun. 11, 2003, now Pat. No. 7,361,255.

(60) Provisional application No. 60/389,784, filed on Jun. 19, 2002.

(51) Int. Cl.
*B01J 19/08* (2006.01)

(52) U.S. Cl. .................. 422/186.04; 361/226

(58) Field of Classification Search ............. 422/186.04; 361/225
See application file for complete search history.

(56) References Cited

U.S. PATENT DOCUMENTS 5,160,699 A * 11/1992 Siegal ........................... 422/24
5,447,626 A * 9/1995 Ido ................................ 204/665

* cited by examiner

*Primary Examiner* — Kishor Mayekar
(74) *Attorney, Agent, or Firm* — Barnes & Thornburg

(57) ABSTRACT

A method and apparatus for application of electrostatic charges to compounds to change the physical characteristics of the compounds. The compound is located within a container, that can be sealed or open, in proximity to an electrode so that there is capacitive coupling between the electrode and the compound. A high frequency, high voltage signal is applied to the electrode for a time sufficient to increase negative ions in the compound, thus changing its physical characteristics. The method can increase the pH and decreases oxidation-reduction potential. A grounded platform is provided for use with a non-conductive container, and the entire apparatus can be provided in a housing enclosure to permit safe application of electrical potential to the compound being treated.

7 Claims, 5 Drawing Sheets

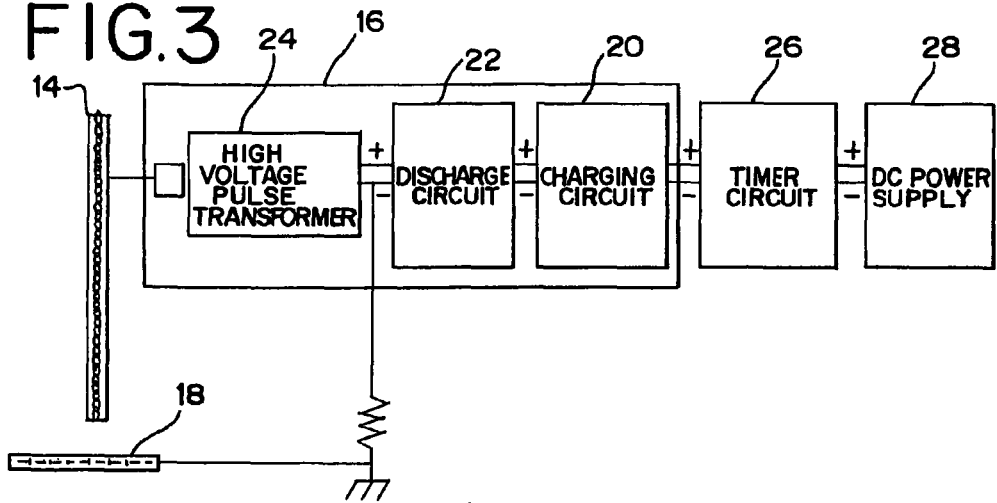
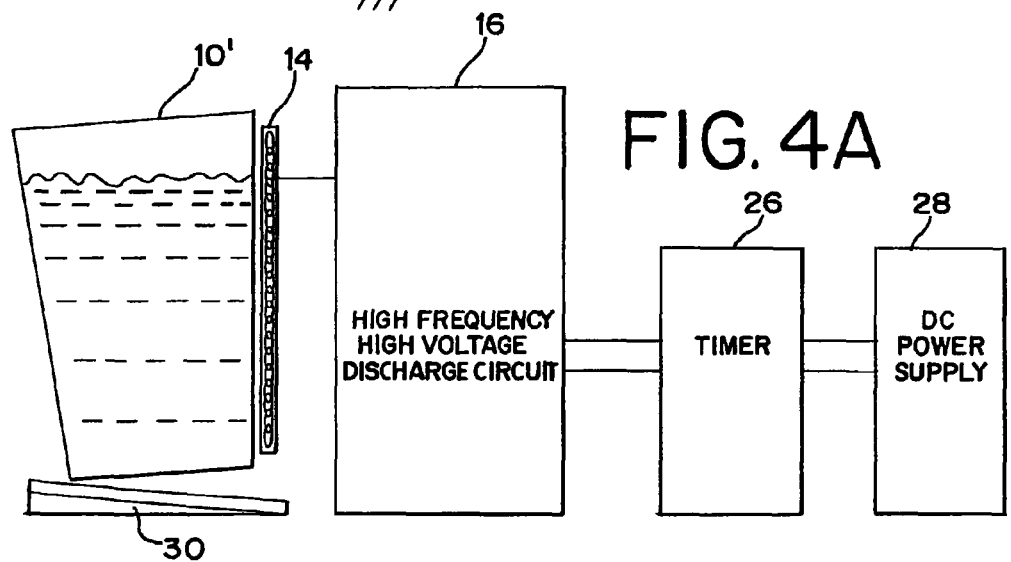
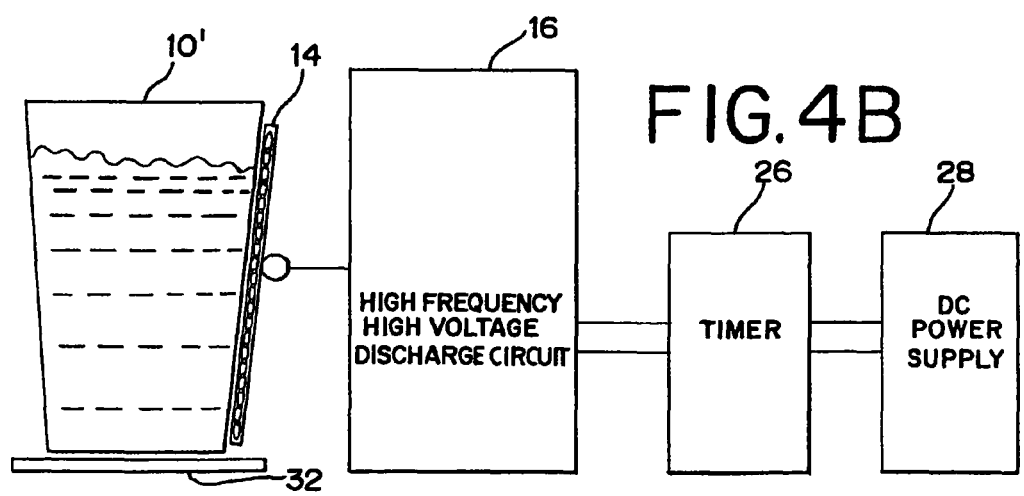

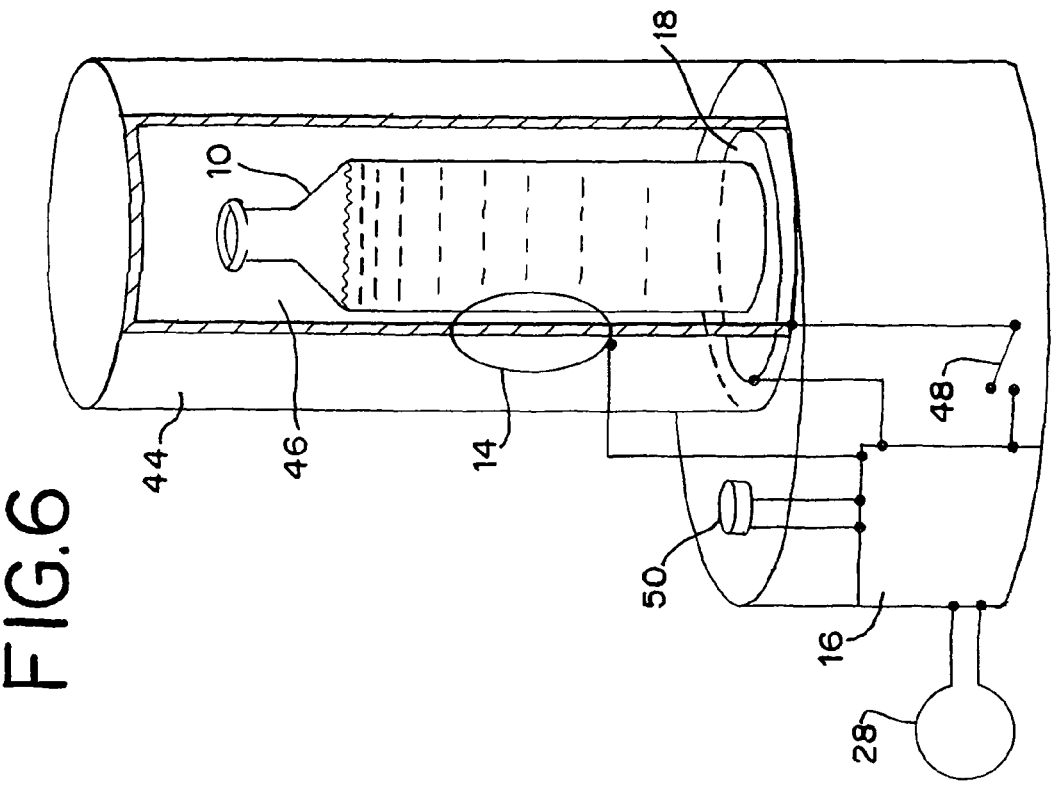
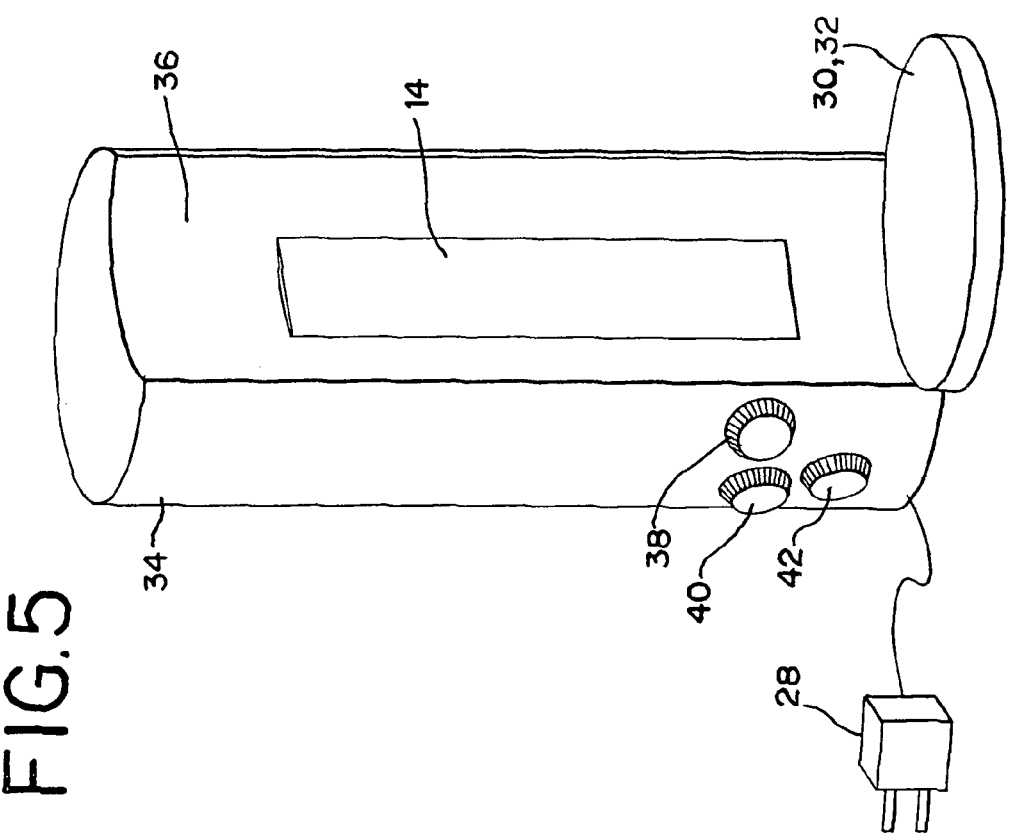

METHOD AND APPARATUS FOR APPLICATION OF ELECTROSTATIC CHARGES TO COMPOUNDS HELD WITHIN CONTAINERS

RELATED APPLICATION

This application is the non-provisional filing of Provisional Application No. 60/389,784, filed Jun. 19, 2002. This application is also a division of co-pending U.S. patent application Ser. No. 10/460,273, filed Jun. 11, 2003, now U.S. Pat. No. 7,361,255, issued Apr. 22, 2008.

BACKGROUND OF THE INVENTION

This invention relates to changing the physical characteristics of a compound and in particular to supplying negative ions to a compound via capacitive coupling using a high frequency, high amplitude voltage.

Compounds, whether they are liquids, solids or gases (and the term "compound" is used herein as such) can have physical characteristics altered by application of electrical energy. When applied to water, application of electrical energy can make it seem fresher.

Freshness in this regard means that negative ions are present in a surplus. For example, ripened fresh fruits and vegetables are loaded with negative ions. As the fruit or vegetables over-ripen, they loose negative ions or are oxidized, that is, they are robbed of negative ions by an oxidant such as oxygen or any other free radical molecule that is naturally electron-seeking. A sliced apple, for example, will turn brown in color from oxidation upon exposure to air in a short amount of time. Coating the cut apple with an antioxidant like Vitamin C will keep the apple from turning brown in color and will maintain freshness.

When ionized with negative ions, water, in the presence of dissolved oxygen becomes more alkaline and the pH increases because of an increase in hydroxide ion (OH—) concentration. The pH of alkaline solutions indicates a surplus of hydroxide (negative ions) over hydrogen ions (positive ions). An increase in negative ions with dissolved oxygen may form more hydroxide ions and may give off some hydrogen gas in the process.

Oxidation-Reduction Potential (ORP) is a measure in millivolts of a compound's potential to Oxidize (an electron acceptor) or Reduce (an electron donor) in a chemical reaction. As a compound is given a surplus of negative ions, ORP becomes more negative in value, indicating that the compound is becoming more of an electron donor. The compound then becomes an Anti-Oxidant (Reducing Agent) and decreases the effects of Oxidants.

In many cases, a net decrease in ORP of as little as 20 millivolts from surplus negative ions being applied electrostatically to drinking water will result in a noticeable difference in taste. The water will taste smoother, wetter and fresher. And this happens whether the water is tap water, bottled water or filtered water.

Ionized water can be consumed with ORP differences of hundreds of millivolts with high pH levels (pH 10) from bubbling ozone through the water. However, this is not necessary and may be harmful to consume large quantities of water on a daily basis with excessive ionization potential from elevated pH levels over a long period of time.

Prior art electrostatic liquid charging systems that impart negative ions within a liquid may use polarized direct current (DC) electrostatic probes that are inserted into the liquid to which the charge will be imparted. These probes must have a positive (anode) and negative (cathode) or ground terminal and must be in contact with the liquid in order to operate. They, therefore must, by design, be either physically inserted into open containers or be enclosed within the liquid inlet supply flow tubes that are not and cannot be hermetically sealed as, for example, off-the-shelf bottled water. They also separate water or aqueous liquids into acid and alkaline components via electrolysis. The alkaline component is usually the important one since it is negatively charged with the acid component being positively charged. The alkaline component is the one, which is consumed with the acid component being either discarded or used for other purposes such as watering plants.

Other systems may bubble ozone gas through the liquid or add chemical salts and colloidal particles that help to impart negative ions to the liquid and/or help to increase the pH. In these cases, the compound needs to be in an open container and be treated by direct contact with the ozone gas, chemicals or colloidal particles. Compounds treated by such systems may be sold in hermetically sealed containers after treatment but they are limited to which compounds can be treated and how much of a compound is charged. They also suffer because the original compound has become chemically modified and in many cases, denatured.

Freshness among other things is a function of the surplus of negative ions. Fruits and vegetables decay from the buildup of the natural production of ethylene, which may increase free radicals that, in turn rob electrons from the fruit or vegetables. Thus, electrostatic charges and negative ions can retard spoilage.

Water is an electrostatically polar molecule that possesses a large net dipole moment and exhibits dipole-dipole interaction between and among its own molecules. In addition, it possesses the most powerful kind of dipole-dipole interaction: hydrogen bonding.

Because of this property, water exists as a liquid crystal that relies upon hydrogen bonding to produce a surface tension that is inherent in its nature. These liquid crystals form long chains of molecules that line up to present a distributed, resistive force, which will resist a certain amount of penetrative force upon the molecules before they yield. Surface tension resists hydration by preventing water to permeate membranes.

When an electrostatic charge is imparted to water, the negative ions tend to break some of the hydrogen bonds between and among the water molecules. Then the molecules form smaller chains and become clusters or monomolecular making the molecules smaller and decreasing the surface tension. This makes water wetter.

Chemicals may be added to water that will decrease the surface tension, called "Surfactants" (surface-active agents). Chemicals that possess this property are called "wetting agents".

Electrostatic fields have a similar effect on water that "wetting agents" have in that they break up the hydrogen bonding inherent in water and aqueous solutions. This causes the water molecules to form rings or clusters instead of long chains thus reducing the surface tension and making the water "wetter". The advantage in beverages and other food or non-food compounds is that no adjunct chemicals need to be added to produce similar "wetting agent" effects. And this can be performed on hermetically sealed contents.

In addition to hydrogen bonding, water also has a high dielectric constant, i.e., it has good electrical insulating properties, which make it tend to hold an electrostatic charge. As negative ions are introduced into water, they are dispersed among the water molecules. According to the laws of physics, the stability of a charged system is increased by the dispersal of the charge. Water is therefore a good electrical capacitor and will hold an electrostatic charge over time.

Electrostatic charges that are introduced into a liquid medium such as water produce negative ions that are attracted to positively charged ends of dipolar molecules i.e., water molecules themselves and other compounds that are either dissolved or remain in suspension in the water. This tendency to hold an electrostatic charge for a definite time may increase the pH of the liquid compound making the compound slightly more electronegative and therefore more alkaline and less acidic. In the presence of a surplus of negative ions, some of the positive hydrogen ions (H+) may bond with other hydrogen ions to form hydrogen gas ($H_2$), which escapes from the water, decreases the hydrogen ion concentration (H+) and increases the hydroxide ion (OH—) concentration. The increase in OH— ions increases the pH of the compound.

Slightly acidic compounds like water, or more strongly acidic compounds like carbonated soda water (carbonic acid) will hold more electrons to the positive ends of their molecules than alkaline compounds because there is a surplus of positive ionic molecular sites. Thus, the effect of charging acidic compounds with negative ions will tend to have a more pronounced effect on the compound than on alkaline compounds, which will tend to repel the negative ions. The effect of charging acidic beverages like coffee & tea, or carbonated beverages like soda water, beer, or champagne with negative ions will tend to take the "edge" or "bite" out of the taste because the positive acidic ends of the molecules will have been slightly neutralized by the negative ions. Taste tests confirm that inexpensive champagne with a high acid "bite" will taste noticeably smoother after charging with negative ions.

Imparting negative ions via electrostatic charges have the following effects on water and other aqueous liquids:
1. Decreases the size of water molecule clusters.
2. Decreases the surface tension.
3. Decreases the Oxidation-Reduction Potential (ORP).
4. Increases the pH.
5. Increases hydration.

SUMMARY OF THE INVENTION

The invention relates to a method and apparatus for supplying negative ions to a compound. The method according to the invention comprises the steps of locating the compound in a container proximate an electrode to permit capacitive coupling between the electrode and the compound. Then, a high frequency, high amplitude voltage is applied to the electrode for a time sufficient to increase negative ions in the compound. This results in an increase in pH and a decrease in oxidation-reduction potential, with the pH increase being less than 0.5 pH units and the oxidation-reduction potential decrease being less than 50 millivolts.

The container can be either sealed or unsealed, and preferably the electrode is located exterior to the container, although thick, insulative containers may require locating the electrode in the container interior. Insulative containers may be located on a grounded platform to bleed off excess current, but only non-conductive containers can be used With a grounded platform. The source of high frequency, high amplitude voltage comprises a high voltage transformer, a discharge circuit and a charging circuit. Optionally, a timer can be provided for operating the source at pre-selected tines.

For safety purposes, the apparatus of the invention can be located within a housing enclosure. An access door is provided in the housing enclosure so that compounds, in a container can be inserted therewithin. A safety switch is connected to the access door for disabling the voltage source if the access door is opened.

BRIEF DESCRIPTION OF THE DRAWINGS

The invention is described in greater detail in the following description of examples embodying the best mode of the invention, taken in conjunction with the drawing figures, in which:

FIG. 3 is a block diagram showing the electrical elements of the invention;

FIGS. 4A and 4B illustrate one form of a portable apparatus according to the invention;

FIG. 5 is an elevational illustration of the invention when employing an external housing;

FIG. 6 is a schematic illustration of the elements of a second form with the apparatus employing a housing enclosure;

DESCRIPTIONS OF EXAMPLES EMBODYING THE BEST MODE OF THE INVENTION

Figure 1:
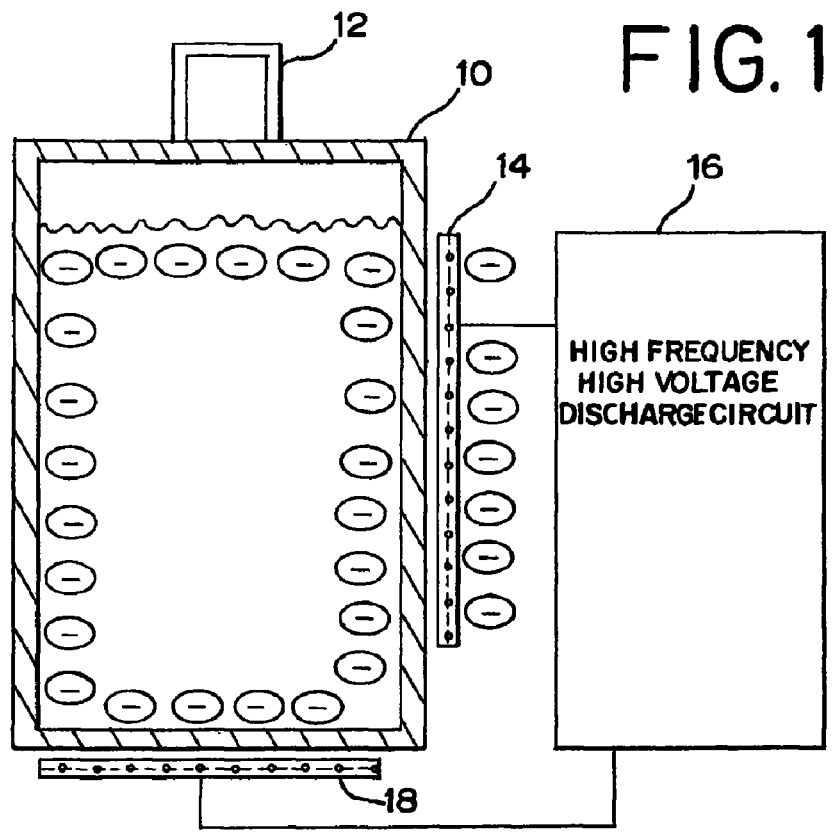
FIG. 1 is a schematic illustration of one form of the apparatus according to the invention.

The method of the invention is useful in the application of electrostatic charges and negative ions to liquid compounds, solid compounds, and gaseous compounds that are enclosed within open or closed containers such as glasses, bottles, jars, cans, cups, carboys, bowls, bladders, pots, tanks, vats, etc. The containers may be composed of metallic or non-metallic material such as cans, pots, glass, plastic, ceramic, rubber, paper, etc., or any other type of composition whether electrically conductive or non-conductive. A liquid compound may be any aqueous, non-aqueous organic solvent (e.g. alcohol), or compounds and metals in their molten state. Solid compounds may be perishable commodities such as fruits, vegetables, coffee, tea, etc. Gaseous compounds may be any aqueous (e.g. steam), non-aqueous organic (e.g. carbon dioxide, methane, acetylene), or non-organic gas (e.g. nitrogen, oxygen).

The method affects the physical characteristics of many compounds in much the same way as a waterfall affects water, making it taste and smell fresh and invigorating. A waterfall imparts negative ions to the water as it flows through oxygen in the air. The present method, however, does not rely on oxygen or ozone or on any other chemical compound to impart negative ions to a compound. Instead, it relies on the capacitive coupling nature of high frequency alternating electric currents and the electrostatic nature of chemical compounds, especially aqueous compounds, to accept and hold a charge of surplus negative ions at the molecular level.

The present method is very mild and may supply negative ions over several minutes with only slight increases in pH (less than 0.5 pH units) and slight decreases in ORP (less than 50 millivolts) while still improving the taste, flavor, and smell of many beverages and compounds. This is time dependent, however, for the longer there is a surplus of negative ions, hydrogen gas may form and escape from open containers which would tend to increase pH due to the increase in hydroxide ion concentration.

The method offers a convenient, low-cost, safe, and effective way to ionize beverages and other liquids and compounds within a container without the addition of adjunct compounds (e.g., oxygen, ozone gas) or other chemical reagents (e.g., silica, potash, magnesium sulfate) and without direct-current electrodes that are immersed within aqueous liquid compounds which separate the aqueous liquid into acidic and alkaline solutions via electrolysis. The method differs from other methods and apparatuses used for electrification because it uses alternating currents of high frequency electricity instead of direct current that relies upon electrolysis and the use of two (anode and cathode) submerged electrodes or probes.

"Closed containers" completely encase the compound and may be temporarily closed or hermetically sealed as in the case of a bottle or can that is purchased "off-the-shelf" such as bottled water, beverages, packaged food, soup, etc. The closed container may also be pressurized as in the case of beer, champagne, soda, and other sparkling beverages.

"Open containers" that only partially contain the compound may be a drinking glass, bottle, coffee cup, opened wine or beer bottle, fruit juice container, pot, etc., in which the sealing top cap, lid or cork has been removed leaving the container open to the ambient surrounding air during the charging process.

The invention allows for electric and electrostatic charges and fields to be applied to a compound such as drinking water or any other beverage or food product while enclosed within a container where the compound within acquires and holds an electrostatic charge of negative ions for a definite time and imparts a desirable characteristic to the compound within the container such as:

1. Improves or modifies the taste, flavor, and smell of beverages or compounds.
2. Increases the compound's anti-oxidant properties. This may provide health benefits by releasing negative ions into the body after consuming the charged compound, which, in turn, neutralizes free radicals and protects cellular life just as antioxidant vitamins do.
3. Increases the absorption rate of water into biological cells (hydration) because the surface tension is reduced.
4. Increases the "shelf-life" of the enclosed compound by preventing or delaying, the oxidation of the compound or free radical formation within the container.
5. Maintains freshness of perishable foods such as fruits and vegetables by preventing spoilage from oxidation and free radicals.

Desirable effects may also be imparted to non-food products, such as agricultural plants, health & beauty products and a myriad of other products.

The present method creates an electrostatic charge which builds up on the surface of any compound, liquid, or gas which, in turn, imparts negative ions to build up within the entire volume of the compound as well, without the need for D.C. probes coming into contact with the liquid itself or the addition of chemicals or the addition of gases (ozone) or any other type of charge imparting method.

The invention uses high frequency alternating current waveforms of high potential voltages to impart an electrostatic charge on liquids, solids, or gases by using the container that holds the compound either as a dielectric that forms a capacitor with the compound or as a ground plane surface to hold and deposit the charge. High frequency alternating currents may be applied to a container with a single high voltage discharge electrode. Applications may also include a ground electrode that will bleed off excess currents, but must be used only with non-conductive containers because conductive containers (cans) will then behave like a conductor instead of a capacitor, and will bleed off electrostatic charges to ground before the compound can become ionized.

If the container is electrically non-conductive, i.e., glass, plastic, rubber, paper, etc., the container then becomes the dielectric of a capacitor with (more or less) conductive contents. Ionization relies upon capacitive coupling between the high voltage discharge electrode and the compound held within a container to impart the electrostatic charge. The high voltage discharge electrode must either be in contact with an outer portion of the container or in close proximity in order for charging to occur. The container generally must be in direct contact with the high voltage discharge electrode but may be a slight distance away from this electrode. In this case, high voltage discharges will make contact with the container through the air via spark and corona discharges.

The charge is initially distributed throughout the entire area of the periphery of the compound due to what is called the "skin effect" of high frequency electric currents. Because of electrostatic fields, instead of electromagnetic fields, this property means that electrons vibrating at high frequency have an affinity to seek a "ground planes", i.e., a capacitive surface. As the vibrating charge is maintained for several minutes, the interior volume of the compound becomes charged also, due to electrostatic attraction from positive ions within the compound. This will even happen with non-conductive, non-polar gas compounds such as acetylene because some of the molecules will become ionized by the electrical potential and high frequency vibration and will then become conductive. Then the charged compound reaches an equilibrium point where it has been charged to capacity. Further charging of aqueous solutions may produce hydrogen gas that will shift the pH of the solution to a more alkaline state due to the excess production of hydroxyl (OH—) ions. But this takes time.

If the container is electrically conductive, i.e., a metal can or pot, the high frequency currents will accumulate on the periphery of the can due to the "skin effect" because conductive surfaces become ground planes for high frequency electric currents. The conductive container will then hold a certain amount of electrostatic charge as if it were a capacitor itself, and then will transfer charge to the contents held within the can directly, as if it were a high voltage discharge electrode. The metal container in this case actually becomes an extension of the high voltage discharge electrode, which is in direct contact with the compound.

The frequency and voltage must be high enough to deliver an electric current through the standard thickness wall of beverage containers whether they are glass, plastic, rubber, paper, etc. As the container wall thickness increases, the ability to deliver a charge decreases until little or no current will flow. Therefore, thicker container walls necessitate higher voltages (when used with external high voltage discharge electrodes) in order to capacitively couple effectively. In these cases, the voltages required may be above 50,000 volts and may be well over 100,000 volts at high frequencies.

As the non-conductive container wall thickness increases, the insulation properties of the container increase and the capacitive coupling decreases. This retards current flow and decreases compound ionization at a given voltage. Therefore, container wall thickness generally must be limited to standard thin-wall beverage container sizes. This can be anywhere between a few thousands of an inch (in the case of plastic bag containers) or up to a quarter-inch in thickness for a glass mug. Insulated coffee mugs suffer because there is a dead air space between the outer and inner container walls and require higher voltages to affect capacitive coupling. Therefore, standard drinking glasses, plastic bottles and ceramic cups are all good containers that can be used with this apparatus.

It is generally desirable to use low power devices because, in practice, they offer the greatest safety from electric shock hazards to the human body. Both conductive or non-conductive containers will be electrified to the extent that touching (with a finger) the container during the charging process will result in an almost unnoticeable electric discharge to the finger coming in contact with the container. This can be seen as a corona in low light conditions. For low power systems this causes no harm because the power levels are too small (about ½ to 1 watt) to be noticed. It is the aim and intent of a large part of the present invention to limit the voltages and current levels to a safe but effective level, especially for portable apparatuses.

Electrostatic ground plane capacitance may also be used with containers that are very thick and completely insulated from high voltage currents. Higher power levels must be used for larger container volumes. The thickness of the container walls must be larger in order to insulate the container from earth grounds. In this case, the high voltage electrode must be inserted directly into the compound either through a container opening or by sealing a conductive wire or electrode that contacts the interior of the container while being exposed to the outside of the container with which the high voltage discharge electrode may contact. As high frequency high voltage currents enter the compound, they immediately fill the periphery of the area of the compound because of the ground plane capacitance of the compound.

Generally, as the compound volume increases, the surface area increases which increases the capacitance of the compound. This in turn necessitates the use of higher voltages, higher current levels and longer charging cycles to distribute the charge. Thus, as volume and/or surface area increase, power levels and charging cycles generally must also increase.

The unique and useful feature of this method and apparatus is that it is very convenient to simply place an open or closed, portable container holding a compound within, into a treatment chamber or onto a platform and operating an electric switch without any other operation needed to impart a negative electrostatic charge upon and into the liquid, solid, or gas compound which in turn provides negative ions to the compound. Closed containers may be hermetically sealed "off-the-shelf" products like beverages of all kinds fit for human or animal consumption.

The method may be used to maintain a constant charge (24 hours-per-day; 7 days-per-week) on larger containers such as 5-gallon carboys or 100-gallon water bladders, or large tanks of milk or other perishable beverages, which must be either mounted on a vehicle or placed in a semi-permanent location due to the large weight of the compound. The method may also be used to charge or maintain a constant charge (24 hours-per-day; 7 days-per-week) on containers of perishable compounds such as fruits and vegetables in order to prevent or delay spoilage. The method may also be used to charge or maintain a constant charge (24 hours-per-day; 7 days-per-week) on such compounds as live, growing agricultural plants that are held within plastic, terra cotta, paper, metal, or other types of containers. The electrostatic charges have a desirable effect on the soil within the pot container and on the plant itself. In addition, the method may be used to maintain ionized water in municipal water tanks. Also, the method may be used for any food service process, for example, applications to beer, wine, or champagne brewing vats or other large containers to improve flavor during processing.

The present method uses a high-voltage alternating electric current of any high frequency waveform that will utilize capacitive coupling and ground plane capacitance between the high voltage electrode power source and the compound held within the container. The nature of high frequency electric currents to flow along the periphery of a conductor is due to the fact that the surface of any conductor acts as an electrostatic "ground plane", which is simply a reservoir for electric charges to accumulate. In electrostatic applications (as opposed to antenna applications) ground planes become capacitors and their capacitance depends upon their conductive surface area. A ground plane does not need to be electrically grounded. It simply needs to be a surface area of conductive material or a surface area that is made conductive via molecular ionization.

High frequency electric currents flow along the periphery of a conductor because as frequency increases in a conductor, inductive reactance (resistance) increases in the conductor, thus decreasing current flow. However capacitive reactance (resistance) decreases as frequency increases which then increases current flow, and increases the net potential charge on the periphery of the conductor. High frequency electric currents, therefore, will tend to flow along the periphery of a conductor because there is a lower resistance to electric charge at the surface of the conductor at higher frequencies. This is called the "skin effect" of high frequency electric currents.

A high frequency electric current that is applied to a liquid compound like water, for example, that is held in an open or closed container will charge the water with electrons like a capacitor to a certain limit of saturation because the water will accept a certain amount of electrostatic charge and hold it for a definite amount of time after the high frequency electric current is shut off or removed from contact. This is because water, by its nature is a good electric insulator, that is, it has a high dielectric constant.

This electrostatic charge may last for a long time or a short time depending on the type of compound and the type of container used. Also, different compounds will tend to hold an electrostatic charge more or less thus increasing or decreasing its ability to hold an electrostatic charge. Charges on compounds may last for hours or days or permanently. But for practical purposes, compounds will usually be consumed quickly after the charging process is finished, which usually takes a few to several minutes.

Some compounds may lose their charge by rapidly shaking the container and the liquid within which will dissipate the electrostatic charge and revert back to its original state of equilibrium. Taste tests of drinking water confirm this. Therefore, the compound may be charged on a continuous basis (24 hours-per-day; 7 days-per-week), which will keep the container and the compound held within fully charged at all times unless the compound is periodically removed and then replaced with another supply of compound.

The method could be used to retard spoilage of some compounds. Milk, for example, will produce lactic acid as it sours, naturally with age. By keeping an electrostatic charge on the colloidal particles (milk is a colloidal suspension), the chemical equilibrium will tend to shift slightly to a more alkaline pH and thus tend to increase shelf life and delay spoilage at the same temperature.

The electrostatic charge that the compound is holding has a beneficial effect in many cases that will improve the flavor, taste and smell of the liquid. This may be any beverage such as water, milk, tea, coffee, soda, beer, wine, champagne, fruit juice; solid foods such as bread, soup, stew; gases such as air, carbon dioxide, oxygen, fragrances, etc.

The electrostatic charge that the compound is holding also has the beneficial effect of preventing oxidation within the compound by offering electrons to free radicals or other oxidizing compounds inherent within the compound. Therefore, it is a good method to keep compounds fresh for extended lengths of time that would normally spoil, rot and decay.

The apparatus may be any pulsed, tone-burst, or continuous discharge high-voltage high-frequency source. The following circuit examples are not meant to be exhaustive, but are meant to cover the majority of usable circuits and to give a sense of the most practical possible waveform generators.

1. Low power high-voltage pulse discharge circuits that deliver a strong pulse followed by a decaying sinusoidal waveform and may be powered by a low voltage power supply 9-18 VDC or 120 VAC/9-18 VDC transformer wall adapter which may be grounded or ungrounded. These circuits can produce voltages from 1,000 volts AC to over 50,000 volts AC at ringing frequencies between 1 KHZ to 100 KHZ with output power levels ranging from ¼ watt to 2 watts. The preferred circuit will have output power levels of about ½ watt and peak voltages of about 20,000 volts AC. These circuits are generally pulsed at between 10 HZ to 100 HZ and generate sinusoidal ringing frequencies between 25 KHZ to 75 KHZ. Each pulse delivers about 0.01 joule to 0.02 joules of energy. The preferred pulse waveform generally will pulse at about 50 HZ and ring with a frequency of about 50 KHZ, with each pulse delivering about 0.01 joule of energy. These low power levels are well below shock safety thresholds and are sufficient to impart electrostatic charges on smaller volumes of liquid compounds of 2-liters or less within several minutes or less. These are small circuits that allow the entire apparatus to be housed in a small, compact kitchen appliance. These low power levels allow the circuits to be powered by small, inexpensive batteries, if need be, that will last up to several weeks under normal usage. Battery power allows the apparatus to be highly portable.

2. Low power high-voltage tone-burst discharge circuits are similar to low power high-voltage pulse discharge circuits except that they generally lack a preceding high-voltage pulse with a decaying sinusoidal waveform and instead have a constant frequency output (on-cycle) with periods of interruption (off-cycle). DC inputs, power levels and frequencies are similar to low power high-voltage pulse discharge circuits.

3. Low power high-voltage continuous discharge high frequency circuits have continuous sinusoidal waveforms and generally produce voltages from about 1,000 volts AC to about 20,000 volts AC with output power levels of about 1 watt to 50 watts at frequencies between 20 KHZ to 100 KHZ. These circuits are generally used to power neon and fluorescent lights. They generally provide more current and may be used with larger volumes of liquids like carboys. However, they may be designed to deliver less current at the same voltage as do low power high-voltage pulse discharge circuits. These circuits are small and compact and may use low voltage power supplies as in (1.) above. DC inputs, power levels and frequencies are similar to low power high-voltage pulse discharge circuits.

4. Low to medium power high-voltage pulse discharge circuits such as that described in U.S. Pat. No. 5,186,171 (A. B. Kuhry), which is powered by line current (120 VAC). This circuit does not have a tuned primary/secondary coil and has a strong pulse followed by a decaying sinusoidal waveform with frequencies between 100 KHZ and 1 MHZ delivering between 50,000 VAC to 100,000 VAC at an output power level between 5 watts to 50 watts. Output waveforms are rich in harmonic frequencies (i.e. a mixture of frequencies with a strong fundamental frequency). This is useful for larger volumes of liquids like carboys or small to medium sized tanks but may be used on any smaller sized volumes of liquids as well.

5. Tesla coils (with tuned primary/secondary coils): Any types that are generally powered by line current (120 VAC). Tesla coils produce a strong pulse followed by a decaying sinusoidal waveform that has a prolonged ringing due to the tuned secondary coil with waveforms that are rich in harmonic frequencies (i.e. a mixture of frequencies with a strong fundamental frequency). These can produce voltages from 50,000 VAC to 500,000.

VAC (and much more) at frequencies generally between 50 KHZ to 1 MHZ with output power levels ranging from a few watts to over 1 kilowatt. These circuits are useful for large volumes of liquid with large surface areas (e.g., tanks, vats, bladders, flow pipes, or even open ponds, or streams).

7. Other high voltage high frequency circuits: Many circuits that are in common public use such as those used for personal protection, i.e., stun guns or similar circuits. These circuits generally have two electrodes that deliver very high peak voltages (50,000 to 500,000 VAC) from battery power supplies and rely on strong pulses or specific waveforms to be useful in personal protection. These circuits may be modified for use as negative ion charging apparatuses. The high voltage discharge electrodes need to be separated so that the output currents do not simply arc back and forth between the two high voltage electrodes. The electrodes must be separated so that the currents will seek a ground plane such as a liquid compound. These circuits are not designed to operate for extended periods of time and are only designed to operate for a few to several seconds, making them less desirable for the present method. Although these circuits may be used in the present invention, they are not the preferred method because they deliver harmful shocks if touched and are unsafe in practical use for a portable apparatus.

FIG. 1 illustrates, schematically, the method and apparatus according to the invention. A container 10, which can be either a sealed or open container, is employed. The container 10 illustrated is a sealed container, having a cap 12. The container 10 is located proximate a high voltage discharge electrode 14 which is activated by a high frequency, high voltage discharge circuit 16. If the container 10 is an insulative structure, a ground electrode 18 can be employed to bleed off excess current. If a conductive container is employed, however, the ground electrode 18 is eliminated.

Figure 2:
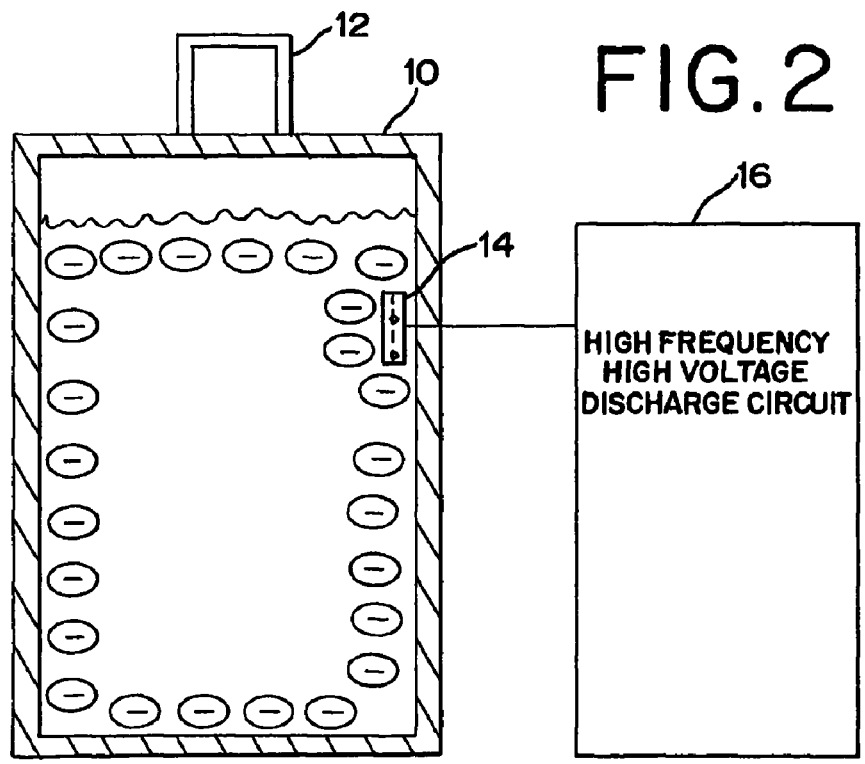
FIG. 2 is a schematic illustration of a second form of the apparatus according to the invention, in which the electrode is located inside the container.

FIG. 2 illustrates a variation of FIG. 1, used for containers that have very thick walls or which are completely insulated from high voltages. In this case, the electrode 14 is appropriately inserted directly into the container 10.

FIG. 3 illustrates the components of a portable version of the invention. The discharge circuit 16 is comprised of three subelements, a charging circuit 20, a discharge circuit 22 and a high voltage pulse transformer 24. A timing circuit 26 may be employed for both initiating and controlling the duration of operation of the discharge circuit 16. If a timing circuit is not employed, a simple switch can be substituted. An appropriate DC power supply 28 provides power to both the timer circuit 26 and the discharge circuit 16.

FIGS. 4A and 4B illustrate the invention when employed with an open container 10'. In FIG. 4A, a platform 30 is employed and is tilted at a slight acute angle toward the electrode 14 as shown. This tends to shift the center of gravity of the container 10' toward the high voltage electrode 14 and holds the container in direct contact with the electrode. The container 10' must be in direct or close contact with the discharge electrode in order to effect the capacitive coupling with the compound (here illustrated as a liquid) in the container 10'. The platform 30 may be a simple non-skid structure that keeps the bottom of the container 10' in position.

In FIG. 4B, the platform 32 is flat, and electrode 14 is tilted to be coextensive with the container 10'. The electrode 14 is adjustable in attitude in relation to the container 10' so that there is contact or a very slight separation between the two.

FIG. 5 illustrates one form of portable apparatus according to the invention. Where the elements are the same as those described above, the same reference numerals are employed. In this form of the invention, the elements of the discharge circuit 16 and the timer circuit 26 are contained within a housing 34. The housing 34 has a curved surface 36, which is curved to accommodate the cylindrical surfaces of containers mounted on the platform 30 or 32. The electrode 14 is appropriately secured to the curved surface 36. A power switch 38 is connected for activating the electrode 14, and various light indicators 40 and 42 may be employed to indicate when the circuit is on and when treatment of a container has concluded. Other indicators such as a buzzer or other type of tone can be used appropriately.

FIG. 6 illustrates a form of the invention similar to FIG. 5, but with a housing enclosure 44 which fully envelopes a container 10 which is being treated. The housing enclosure 44 includes a door 46 through which the container 10 is inserted. The door 46 may be coupled to a safety switch 48, which inhibits operation of the circuit 16 when the door 46 is open. A push button 50 is used to initiate the discharge circuit 16.

Figure 7:
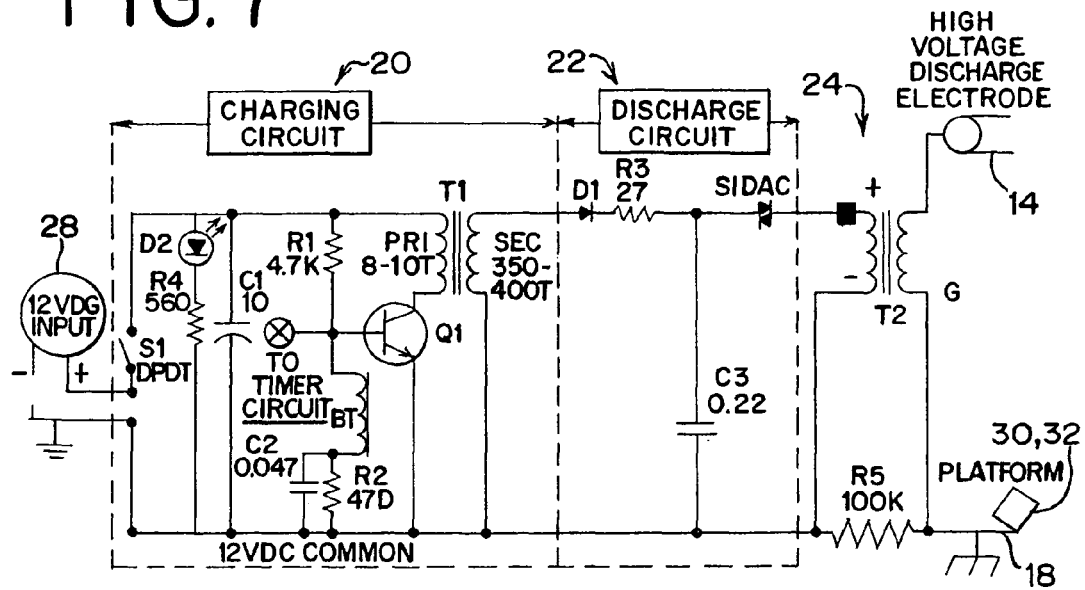
FIG. 7 is a circuit diagram for one form of the charging circuit, discharge circuit and high voltage pulse transformer.
Figure 8:
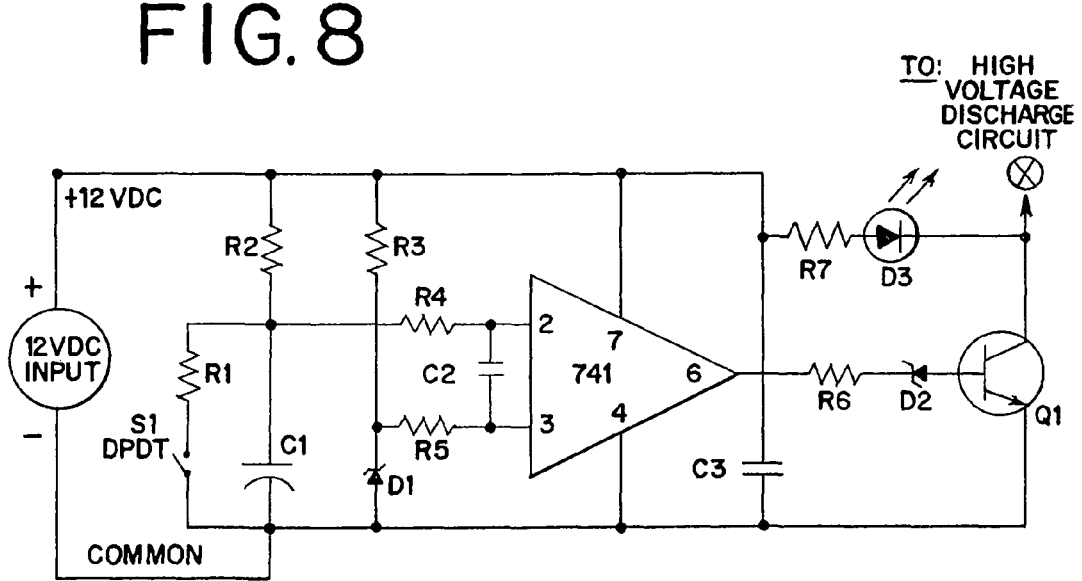
FIG. 8 is a circuit illustration of one form of a timer circuit according to the invention.

FIG. 7 illustrates, in greater detail, one form of the charging circuit 20, the discharge circuit 22, and the high voltage pulse transformer 24. Those elements are shown in relation to the remaining parts of the apparatus according to the invention. The timer circuit 26 is not shown in FIG. 7, but rather is shown in FIG. 8.

Figure 9:
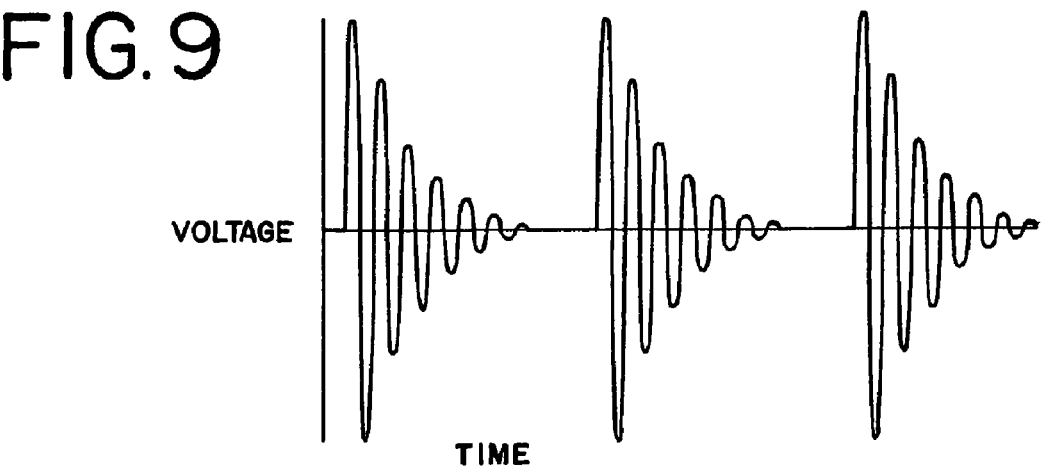
FIGS. 9, 10 and 11 illustrate three voltage waveforms that can be generated by the electrode of the invention for treating compounds.
Figure 10:
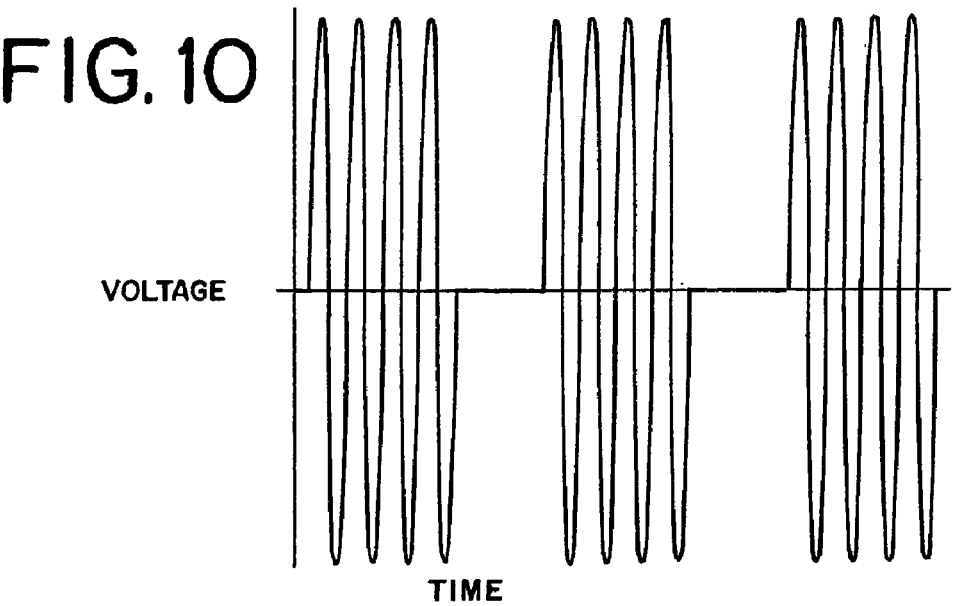
Figure 11:
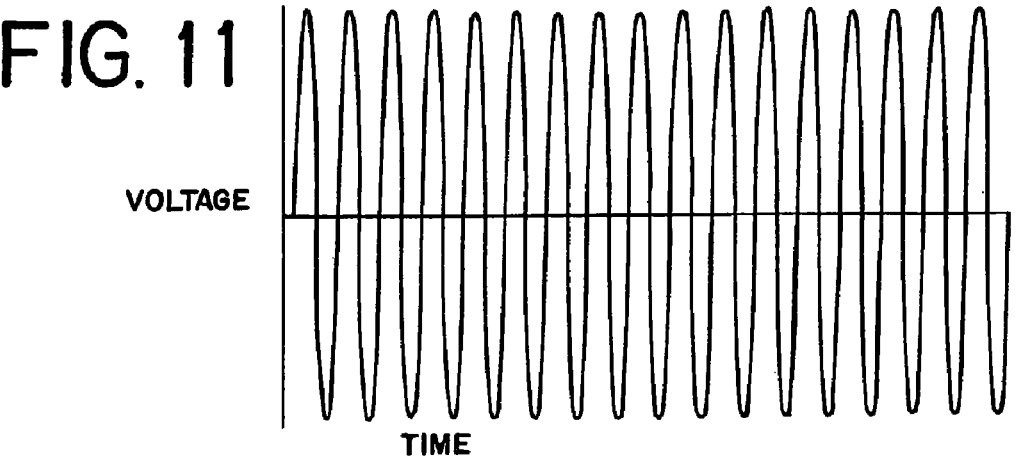

FIGS. 9 through 11 show three different appropriate waveforms. FIG. 9 illustrates a strong pulse followed by a decaying sinusoidal waveform. FIG. 10 is similar, except that there is a constant frequency output with periods of interruption. FIG. 11 illustrates a continuous sinusoidal waveform.

The invention provides a simple and effective manner of providing an application of electrostatic charges to increase negative ions in liquid, solid or gaseous compounds. Various changes can be made to the invention without departing from the spirit thereof or scope of the following claims.

What is claimed is:

1. An apparatus for supplying negative ions to a compound, comprising a. an electrode positionable proximate the compound to permit capacitive coupling between said electrode and the compound, and b. a high frequency, high amplitude voltage source connected to said electrode, said voltage source having a frequency in excess of 10 kHz and an amplitude in excess of 10 kV.

2. The apparatus according to claim 1, including a grounded platform upon which the compound is located.

3. The apparatus according to claim 1, in which said source comprises a high voltage pulse transformer, a discharge circuit and a charging circuit.

4. The apparatus according to claim 3, including a timer for operating said source at pre-selected times.

5. The apparatus according to claim 1, including a housing enclosure containing said electrode.

6. The apparatus according to claim 5, in which said housing includes an access door.

7. The apparatus according to claim 6, including a safety switch connected to said access door for disabling said source if said access door is open.

\* \* \* \* \*